United States Patent
Le et al.

(10) Patent No.: US 12,468,514 B2
(45) Date of Patent: Nov. 11, 2025

(54) CODE PROCESSING METHOD AND APPARATUS, AND STORAGE MEDIUM

(71) Applicant: HUAWEI TECHNOLOGIES CO., LTD., Guangdong (CN)

(72) Inventors: Yongnian Le, Shanghai (CN); Bo Huang, Shenzhen (CN); Weifeng Hui, Xi'an (CN); Jing Luo, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 271 days.

(21) Appl. No.: 18/185,894

(22) Filed: Mar. 17, 2023

(65) Prior Publication Data

US 2023/0229410 A1    Jul. 20, 2023

Related U.S. Application Data

(63) Continuation of application No. PCT/CN2021/117845, filed on Sep. 11, 2021.

(30) Foreign Application Priority Data

Sep. 21, 2020  (CN) ........................ 202010996387.6
Sep. 30, 2020  (CN) ........................ 202011066288.4

(51) Int. Cl.
    G06F 9/44       (2018.01)
    G06F 8/41       (2018.01)
    G06F 8/51       (2018.01)

(52) U.S. Cl.
    CPC ............... *G06F 8/51* (2013.01); *G06F 8/433* (2013.01)

(58) Field of Classification Search
    CPC .... G06F 8/51; G06F 8/433; G06F 8/53; G06F 8/41; G06F 9/4552; G06F 11/362; G06F 21/566; G06F 11/3688
    See application file for complete search history.

(56) References Cited

U.S. PATENT DOCUMENTS

| | | | |
|---|---|---|---|
| 10,338,902 B1* | 7/2019 | Sevigny | G06F 8/53 |
| 2019/0227779 A1 | 7/2019 | Jaeger et al. | |
| 2022/0058007 A1* | 2/2022 | Deng | G06F 8/51 |
| 2023/0367569 A1* | 11/2023 | Kasper | G06F 9/44578 |

FOREIGN PATENT DOCUMENTS

CN    103235724 A    8/2013

OTHER PUBLICATIONS

International Search Report and Written Opinion in International Appln. No. PCT/CN2021/117845, mailed on Dec. 8, 2021, 15 pages (with English translation).
Extended European Search Report in European Appln No. 21868568.3, dated Jan. 3, 2024, 11 pages.

* cited by examiner

*Primary Examiner* — Chuck O Kendall
(74) *Attorney, Agent, or Firm* — Fish & Richardson P.C.

(57) ABSTRACT

This application discloses code processing methods, apparatuses, and storage media. An example method includes: obtaining a first code in low-level language and applicable to a source platform; decompiling the obtained first code to obtain an intermediate representation (IR); and then compiling the IR into a second code in low-level language and applicable to a first target platform, where the source platform and the target platform have different instruction sets.

20 Claims, 9 Drawing Sheets

IR before optimization

```
...
%8= tail call {i64, i64} @_remill_read_memory_128(%struct.Memory*
%0,i64 %7) #2
%9= extractvalue {i64, i64} %8, 0
%10= extractvalue {i64, i64} %8, 1
%11=insertelement <2 x i64> undef, i64 %9, i32 0
%12=insertelement <2 x i64> %11, i64 %10, i32 1
...
```

Optimize based on a capability of a target platform

Optimized IR

```
...
%2=inttoptr i64 %ARG1_64 to i128*
%3=load i128, i128* %2
...
```

FIG. 6

CODE PROCESSING METHOD AND APPARATUS, AND STORAGE MEDIUM

CROSS-REFERENCE TO RELATED APPLICATIONS

This application is a continuation of International Application No. PCT/CN2021/117845, filed on Sep. 11, 2021, which claims priority to Chinese Patent Application No. 202011066288.4, filed on Sep. 30, 2020, and Chinese Patent Application No. 202010996387.6, filed on Sep. 21, 2020. All of the aforementioned patent applications are hereby incorporated by reference in their entireties.

TECHNICAL FIELD

Embodiments of this application relate to the field of code processing technologies, and in particular, to a code processing method and apparatus, and a storage medium.

BACKGROUND

The x86 platform is a general-purpose computing platform developed by Intel, specifically referring to a series of backward compatible instruction set architectures of central processing units based on Intel 8086. The x86 platform has evolved since its release in 1978, and it now grows into a huge and complex instruction set.

In actual application, developers usually develop, based on the x86 platform, various software that can be applied to the x86 platform, thereby constructing a huge software ecosystem. As a result, currently, many types of application software can be applied only to the x86 platform, but cannot be applied to other platforms such as the ARMv8 platform (a processor architecture, supporting a 64-bit instruction set, released by the ARM company).

During construction of a software ecosystem of the ARMv8 platform or another platform, a skilled person usually writes software code according to a code rule (for example, an instruction set) of the platform, to make developed software applicable to the platform. However, it is usually difficult to develop new software for the platform, resulting in low software development efficiency. This makes it difficult to construct a software ecosystem of the ARMv8 platform or another platform. Therefore, currently, a method in which a difficulty in constructing a software ecosystem of a platform can be reduced is urgently required.

SUMMARY

Embodiments of this application provide a code processing method and apparatus, and a storage medium, to reduce a difficulty in constructing a software ecosystem of a platform.

According to a first aspect, an embodiment of this application provides a code processing method, in which software code on a source platform is migrated to a first target platform to reduce a difficulty in constructing a software ecosystem of the platform. The source platform and the first target platform are different platforms, and may specifically have different instruction sets. During specific implementation, a low-level language-based first code that is applied to the source platform may be first obtained, where the first code may be, for example, an assembly language-based or machine language-based code, and can be identified by the source platform. Then, the obtained first code may be decompiled to obtain a first intermediate representation (IR), where the first IR may be an IR related to the first target platform, or may be an IR unrelated to the first target platform. Then, the first IR may be compiled to obtain a low-level language-based code that is applicable to the first target platform, and the obtained code can be identified and run by the first target platform, so that the software code on the source platform is migrated to the first target platform.

In addition, the foregoing process of decompiling and compiling the software code does not require participation of a developer, which separates the developer and the software code, and reduces a possibility that the software code is exposed to the developer. A software operator may perform optimization and secondary development on the software code migrated to the first target platform, to maintain the software code migrated to the first target platform.

The source platform may be, for example, the x86 platform, and the first target platform may be an ARM platform, which is specifically the ARMv8 platform. Certainly, in actual application, the source platform may be any platform, and the first target platform may be any platform different from the source platform.

The foregoing method may be applied locally, or may be applied to a cloud. When being applied locally, the method may be specifically applied to a local terminal, a server, or the like. When being applied to the cloud, the method may be specifically presented to a user in a form of a cloud service.

In a possible implementation, the first code on the source platform may be migrated to any target platform. Specifically, the first code being migrated to the first target platform and a second target platform separately is used as an example. The low-level language-based code that is applicable to the first target platform may be obtained in the foregoing decompilation and compilation processes. Further, an IR corresponding to the second target platform may be obtained based on the first code in the decompilation process. The IR corresponding to the second target platform is different from the first IR, and is applicable to a target platform different than that of the first IR. The first target platform and the second target platform have different instruction sets. The second target platform and the source platform also have different instruction sets. In other words, when the software code on the source platform is migrated to any platform, the foregoing decompilation and compilation processes may be used for implementation.

In a possible implementation, a target platform selection interface may be presented to the user, where the target platform selection interface may present a plurality of candidate target platforms, for the user to select a target platform. Then, a target platform selected by the user may be determined from the plurality of target platforms in response to a selection operation performed by the user on a target platform. For example, the first target platform may be determined based on the selection operation performed by the user on the target platform selection interface.

In a possible implementation, in a process of decompiling the first code, annotation information of the first code may be first obtained. The annotation information may include, for example, any one or more of a type, a quantity, or a jump address type of a parameter in the first code. Then, the first code may be decompiled based on the annotation information during decompilation, to obtain the first IR. The parameter type in the annotation information is used as an example. Assuming that a length of the parameter in the first code is 64 bits, in the first IR obtained by decompiling the first code, the length of the parameter may still be 64 bits (for example, a floating point), rather than change to 32 bits (for example, an integer). In this way, the type of the parameter remains unchanged after decompilation, thereby reducing a possibility of a logic error in the first IR.

In a possible implementation, the initially obtained IR may be further optimized in the process of decompiling the first code. Specifically, the second IR may be obtained after the first code is decompiled. Generally, the second IR may be optimized in some aspects. For example, a data reading manner in the generated second IR is reading 64-bit data at one time, while the first target platform is capable of reading 128 bits at one time. In this case, the data reading manner in the second IR may be optimized to reading 128-bit data at one time. During specific implementation, the second IR may be optimized based on the first target platform, for example, based on hardware or a logical capability of the first target platform, to obtain the first IR. In this way, more efficient code can be obtained after the first IR is compiled subsequently.

In a possible implementation, prompt information may be further generated and presented. The prompt information may be used to prompt for a to-be-checked item, and the to-be-checked item may be generated based on a difference between the first target platform and the source platform. For example, the prompt information may be specifically a highlighted instruction on the source platform and an instruction of the first target platform that has same semantics as the highlighted instruction, so that the user determines, based on the prompt information, whether the instruction of the first target platform that is translated based on the instruction on the source platform is accurate.

In a possible implementation, when the foregoing method is applied to the cloud, the user may provide the first code to the cloud. For example, the user may send a code processing request including the first code to the cloud by using a terminal, a client, or the like, so that the cloud obtains the first code. Correspondingly, after performing corresponding decompilation and compilation processing on the received first code, the cloud may send, to the user, the obtained low-level language-based code that is applicable to the first target platform, so that the user obtains the desired code.

In a possible implementation, the first code may be specifically decompiled based on an instruction semantic library corresponding to the source platform. For example, the instruction semantic library may include semantics of a plurality of instructions of the source platform. In this way, in a decompilation process, all instructions in the first code may be traversed, and semantics of the instructions may be identified based on the instruction semantic library, so that the first code may be decompiled into a corresponding IR of a compiler based on the identified semantics of the instructions.

In a possible implementation, the instruction semantic library may be further modified by the user. For example, the user may add a single instruction multiple data (SIMD) instruction or the like to the instruction semantic library, for identification of the SIMD instruction in the first code. In this way, corresponding decompilation processing can be performed on the SIMD instruction in the first code in the decompilation process, so that the first IR includes an instruction with vectorized semantics. Correspondingly, the terminal or the server may correspondingly modify the instruction semantic library in response to a modification operation performed by the user on the instruction semantic library.

In a possible implementation, in an inline assembly scenario, the software code to be migrated may include both the low-level language-based first code and a high-level language-based variable. Therefore, when obtaining the first code, the terminal or the server further obtains the high-level language-based variable to translate the first code into the first IR including a function when decompiling the first code. The function includes a formal parameter, and an actual parameter corresponding to the formal parameter may be a variable. In other words, in the decompilation process, the high-level language-based variable may be transferred as an actual argument to a formal parameter in the function.

In a possible implementation, during translation of the first code into the first IR including a function, semantics of each instruction string in the first code may be specifically determined. Then, a function corresponding to the semantics of each instruction string in the first code may be determined based on correspondences between semantics and functions, and the first IR including a function may be generated.

In a possible implementation, before the first code is decompiled, variables in the first code may be further relocated. In this way, after the first code is decompiled, the variables in the obtained first IR may have different logical addresses. For example, the first IR includes a first variable and a second variable. The first variable may have a first logical address, and the second variable may have a second logical address. The first logical address and the second logical address are different logical addresses. During specific implementation, before the first code is decompiled, the preset first logical address may be configured for the first variable in the first code, and the preset second logical address may be configured for the second variable in the first code. Both the first logical address and the second logical address may be abstract logical addresses.

In a possible implementation, because the source platform and the first target platform may differ in a function calling convention or a SIMD instruction, during decompilation of the first code, the first code may be specifically decompiled based on the function calling convention or the SIMD instruction of the first target platform, so that finally obtained code can meet a requirement, for the function calling convention or the SIMD instruction, of the first target platform. In actual application, decompilation processing may be specifically performed based on the difference in the function calling convention or the SIMD instruction between the first target platform and the source platform.

In a possible implementation, when the first code includes the SIMD instruction, the first code may be decompiled in a direct vectorization manner. Specifically, a low-level language-based third code on the target platform may be first generated. The third code can be used to describe vectorized semantics of the SIMD instruction in the first code. For example, the third code may be code including an intrinsic function. Then, the third code may be decompiled to obtain the first IR that corresponds to the SIMD instruction of the first target platform and that has a mark for vectorization. In this case, the first IR is associated with the first target platform.

In a possible implementation, when the first code includes the SIMD instruction, the first code may be decompiled in an indirect vectorization manner. During specific implementation, a high-level language-based fourth code may be first generated, where the fourth code can be used to describe the vectorized semantics of the SIMD instruction in the first code. Then, the fourth code may be compiled, to obtain the first IR having the mark for vectorization. Then, in a compilation phase, automatic vectorized compilation may be performed on an IR having a mark for vectorization, to generate low-level language-based code that is applicable to the first target platform. The code may include the SIMD instruction of the first target platform. In this way, indirect vectorization of the SIMD instruction in the first code is implemented.

According to a second aspect, an embodiment of this application further provides a code processing method. In a process of implementing software code migration, a low-level language-based first code that is applied to a source platform may be obtained, and then a second code may be output based on the first code. The second code is a low-level language-based code that can be applied to a first target platform. The second code is obtained by processing the obtained first code, for example, by decompiling and then compiling the first code. The source platform and the first target platform have different instruction sets. In this way, the second code applicable to the first target platform may be obtained based on the first code on the source platform, and the obtained second code can be identified and run by the first target platform, so that software code on the source platform can be migrated to the first target platform.

In addition, the foregoing processing process of the first code may not require participation of a developer, which separates the developer and the software code, and reduces a possibility that the software code is exposed to the developer. A software operator may perform optimization and secondary development on the software code migrated to the first target platform, to maintain the software code migrated to the first target platform.

The source platform may be, for example, the x86 platform, and the first target platform may be an ARM platform, which is specifically the ARMv8 platform. Certainly, in actual application, the source platform may be any platform, and the first target platform may be any platform different from the source platform.

In a possible implementation, the second code may be specifically output and presented through a code display interface. Then, the user can view the translated code on the code display interface, so that operations such as secondary development and optimization can be performed based on the translated code.

In a possible implementation, the processing process of the first code may be applied to a cloud. The first code may be specifically obtained from the user. For example, the user may send a code processing request to the cloud by using a terminal, a client, or the like, where the code processing request may carry the first code or the like. Certainly, the user may provide the first code or the like to the cloud in another manner. In this way, after the cloud processes the first code and obtains the second code, the second code may be specifically output to the user, for example, the second code may be presented on a code display interface of a terminal used by the user.

In a possible implementation, before the first code is processed, a target platform selection interface may be further presented. The target platform selection interface may present a plurality of candidate target platforms, for the user to select a target platform. Then, a target platform selected by the user may be determined from the plurality of target platforms in response to a selection operation performed by the user on a target platform. For example, the first target platform may be determined based on the selection operation performed by the user on the target platform selection interface.

In a possible implementation, during processing of the first code, specifically, an instruction semantic library corresponding to the source platform may be first obtained, and the first code is processed by using the instruction semantic library. For example, the instruction semantic library may include semantics of a plurality of instructions of the source platform. In this way, during processing of the first code, all instructions in the first code may be traversed, and semantics of the instructions may be identified based on the instruction semantic library, so that the first code may be decompiled into a corresponding IR of a compiler based on the identified semantics of the instructions.

In a possible implementation, the user may further modify the instruction semantic library corresponding to the source platform. For example, the user may add a SIMD instruction or the like to the instruction semantic library, for identification of the SIMD instruction or the like in the first code. In this case, the instruction semantic library corresponding to the source platform may be modified in response to a modification operation performed by the user on the instruction semantic library. In this way, in a process of decompiling the first code, decompilation may be performed based on a modified instruction semantic library.

In a possible implementation, after the second code is obtained based on the first code, prompt information may be further generated and presented. The prompt information is used to prompt for a to-be-checked item, and the to-be-checked item is generated based on a difference between the first target platform and the source platform. For example, the prompt information may be specifically a highlighted instruction on the source platform and an instruction of the first target platform that has same semantics as the highlighted instruction, so that the user determines, based on the prompt information, whether the instruction of the first target platform that is translated based on the instruction on the source platform is accurate.

In a possible implementation, not only the second code is output, but also a first IR obtained by decompiling the first code may be presented. Correspondingly, the output second code is obtained by compiling the first IR. In this way, the user may perform operations such as debugging and observation on the presented first IR, and provide corresponding analysis.

In a possible implementation, a second IR may be further presented, where the second IR is obtained by decompiling the first code. Specifically, in a decompilation process, the second IR may be first obtained by decompiling the first code, and then the second IR may be optimized to obtain the first IR. In this way, the first IR obtained after the optimization can be more efficient in a code execution phase. For example, a data reading manner in the generated second IR is reading 64-bit data at one time, while the first target platform is capable of reading 128 bits at one time. In this case, the data reading manner in the second IR may be optimized to reading 128-bit data at one time, to save one additional data reading operation during reading of a same amount of data.

In a possible implementation, the output first IR may be further modified by the user. For example, when determining that the output first IR has a logic error or has code that can be optimized, the user may modify the first IR. In this case, the terminal or the server may obtain a modified first IR in response to a modification operation on the first IR, and then compilation may be performed based on the modified first IR, to obtain a favorable third code. The third code is a low-level language-based code that is applicable to the first target platform, and the third code may be presented to the user.

In a possible implementation, in a case of generating, based on the first code, a low-level language-based code that is applicable to a second target platform, the first code may be decompiled into a third IR, and subsequently the third IR may be compiled to obtain the low-level language-based code that is applicable to the second target platform. As IRs corresponding to different target platforms may be different, different IRs and code may be generated for different target platforms.

In a possible implementation, the user may further modify the output second code. For example, the user may perform secondary development and optimization based on the output second code. Correspondingly, a modified second code may be obtained in response to a modification operation performed by the user on the second code. In addition, the modified second code may be presented to the user in real time, so that the user can view the modified second code.

In a possible implementation, during obtaining of the first code, not only the low-level language-based first code that is applied to the source platform may be obtained, but also a high-level language-based variable may be obtained. For example, in an inline assembly scenario, not only code in an assembly language considered as a low-level language is included, but also a variable in a high-level language, for example, a variable in a C/C++ language, may be included.

According to a third aspect, based on a same inventive concept as the method embodiment of the first aspect, an embodiment of this application provides a computing apparatus. The apparatus has functions corresponding to the implementations of the first aspect. The functions may be implemented by hardware, or may be implemented by hardware executing corresponding software. The hardware or the software includes one or more modules corresponding to the functions.

According to a fourth aspect, based on a same inventive concept as the method embodiment of the second aspect, an embodiment of this application provides two computing apparatuses. The apparatus has functions corresponding to the implementations of the second aspect. The functions may be implemented by hardware, or may be implemented by hardware executing corresponding software. The hardware or the software includes one or more modules corresponding to the functions.

According to a fifth aspect, an embodiment of this application provides a computing apparatus, including a processor and a memory. The memory is configured to store instructions. When the computing apparatus runs, the processor executes the instructions stored in the memory, so that the apparatus performs the code processing method in any one of the first aspect or the implementations of the first aspect. It should be noted that the memory may be integrated into the processor, or may be independent of the processor. The apparatus may further include a bus. The processor is connected to the memory by using the bus. The memory may include a readable memory and a random access memory.

According to a sixth aspect, an embodiment of this application provides a computing apparatus, including a processor and a memory. The memory is configured to store instructions. When the computing apparatus runs, the processor executes the instructions stored in the memory, so that the apparatus performs the code processing method in any one of the second aspect or the implementations of the second aspect. It should be noted that the memory may be integrated into the processor, or may be independent of the processor. The apparatus may further include a bus. The processor is connected to the memory by using the bus. The memory may include a readable memory and a random access memory.

According to a seventh aspect, an embodiment of this application further provides a readable storage medium, where the readable storage medium stores a program or instructions. When the program or the instructions are run on a computer, the code processing method in any one of the first aspect or the implementations of the first aspect is performed.

According to an eighth aspect, an embodiment of this application further provides a readable storage medium, where the readable storage medium stores a program or instructions. When the program or the instructions are run on a computer, the code processing method in any one of the second aspect or the implementations of the second aspect is performed.

According to a ninth aspect, an embodiment of this application further provides a computer program product including instructions. When the computer program product runs on a computer, the computer is enabled to perform the code processing method in any one of the first aspect or the implementations of the first aspect.

According to a tenth aspect, an embodiment of this application further provides a computer program product including instructions. When the computer program product runs on a computer, the computer is enabled to perform the code processing method in any one of the second aspect or the implementations of the second aspect.

In addition, for technical effects brought by any implementation of the third aspect to the tenth aspect, refer to technical effects brought by different implementations of the first aspect, or refer to technical effects brought by different implementations of the second aspect. Details are not described herein again.

BRIEF DESCRIPTION OF DRAWINGS

To describe the technical solutions in embodiments of this application more clearly, the following briefly describes the accompanying drawings for describing embodiments. It is clear that the accompanying drawings in the following description show merely some embodiments of this application, and an ordinary person skilled in the art may still derive other drawings from these accompanying drawings.

FIG. 6 is a schematic diagram of IRs before and after optimization according to an embodiment of this application;

DESCRIPTION OF EMBODIMENTS

In construction of a software ecosystem of a platform, a skilled person usually writes software that can be run on the platform. However, this manner of manually writing software program code not only features low efficiency in software development, but also tends to encounter various program errors. This makes it difficult to develop software, and therefore makes it difficult to construct a software ecosystem of the platform.

Therefore, an embodiment of this application provides a code processing method, so that software on another platform may be migrated to a current platform, which enables more software to be successfully run on the current platform, and therefore reduces a difficulty in constructing a software ecosystem of the current platform. During specific implementation, software code on a source platform (namely, the foregoing another platform) may be decompiled to obtain an internal representation (IR) of a compiler, and then the IR is compiled into a low-level language-based code that is applicable to a target platform (the foregoing current platform), so that the code can be successfully run on the target platform. In this way, software of the source platform can be migrated to the target platform for running. Certainly, the source platform and the target platform are different platforms, and the two platforms differ from each other at least in that the two platforms have different instruction sets.

In addition, the foregoing process of decompiling and compiling the software code does not require participation of a developer, which separates the developer and the software code, and reduces a possibility that the software code is exposed to the developer. A software operator may perform optimization and secondary development on the software code migrated to the target platform, to maintain the software code migrated to the target platform.

Figure 1:
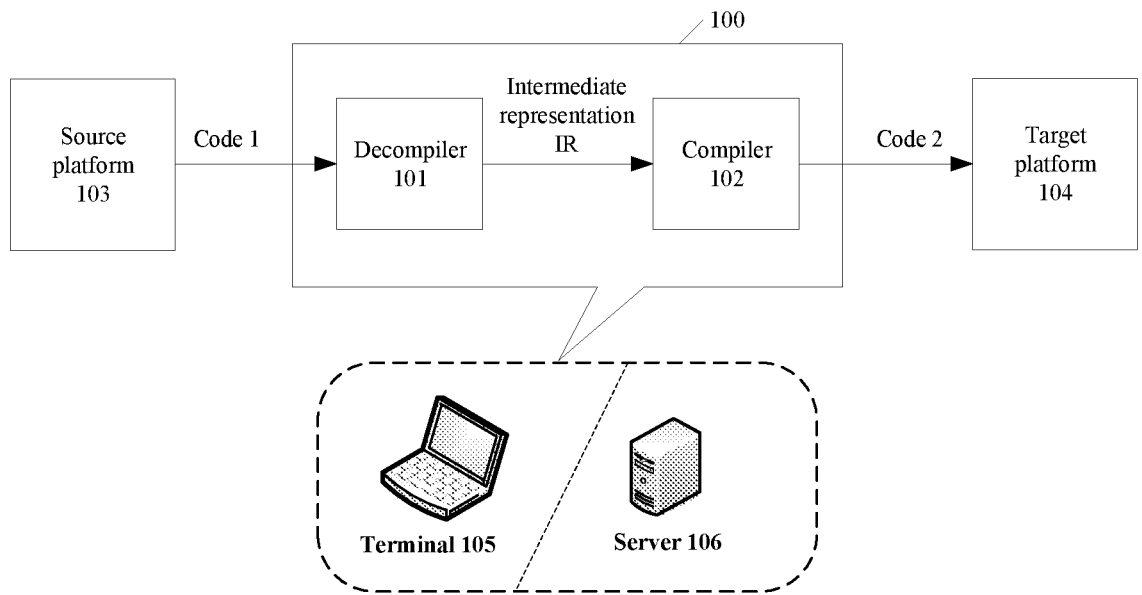
FIG. 1 is a schematic diagram of an example system architecture according to an embodiment of this application.

In an example, the foregoing code processing method may be applied to a system architecture shown in FIG. 1. As shown in FIG. 1, the system architecture 100 includes a decompilation module 101 and a compilation module 102. For code 1 applied to the source platform 103, the decompilation module 101 decompiles the code 1 to obtain an IR, and then transfers the IR obtained through decompilation to the compilation module 102. Then, the compilation module 102 compiles the IR into low-level language-based code 2 that is applicable to a target platform 104. In this way, the obtained code 2 may be run on the target platform 104.

In actual application, the decompilation module 101 may be a software-based functional module, or may be implemented by a device having a decompilation function, for example, a decompiler. Similarly, the compilation module 102 may be implemented by a device having a compilation function, for example, a compiler. The decompilation module 101 and the compilation module 102 may be deployed on the target platform 104, or may be deployed on a terminal 105, a server 106, or the like. For example, in a case that the decompilation module 101 and the compilation module 102 are deployed on the terminal 105 and the server 106, the decompilation module 101 may be deployed on the server 106, and the compilation module may be deployed on the terminal 105. Alternatively, both the decompilation module 101 and the compilation module 102 may be deployed on the server 106 located in a cloud. In this case, in a software migration process, the terminal 105 may send software code to the cloud (which may be specifically the server 106 in the cloud). For example, the terminal 105 may send a code processing request to the cloud, where the code processing request includes software code that needs to be migrated. Then, after performing the foregoing decompilation and compilation processing, the cloud (the server 106) may obtain a low-level language-based code that is applicable to the target platform, and send the code to the terminal 105. In this way, the terminal 105 can obtain the software code that can be applied to the target platform, thereby implementing software migration. Certainly, in an actual application, the server 106 may also be a local server.

To make the objectives, features, and advantages of this application clearer and more comprehensible, the following describes various non-limiting implementations in embodiments of this application with reference to the accompanying drawings by using examples. It is clear that the described embodiments are merely some but not all of embodiments of this application. All other embodiments obtained by a person of ordinary skill in the art based on embodiments of this application without creative efforts shall fall within the protection scope of this application.

Figure 2:
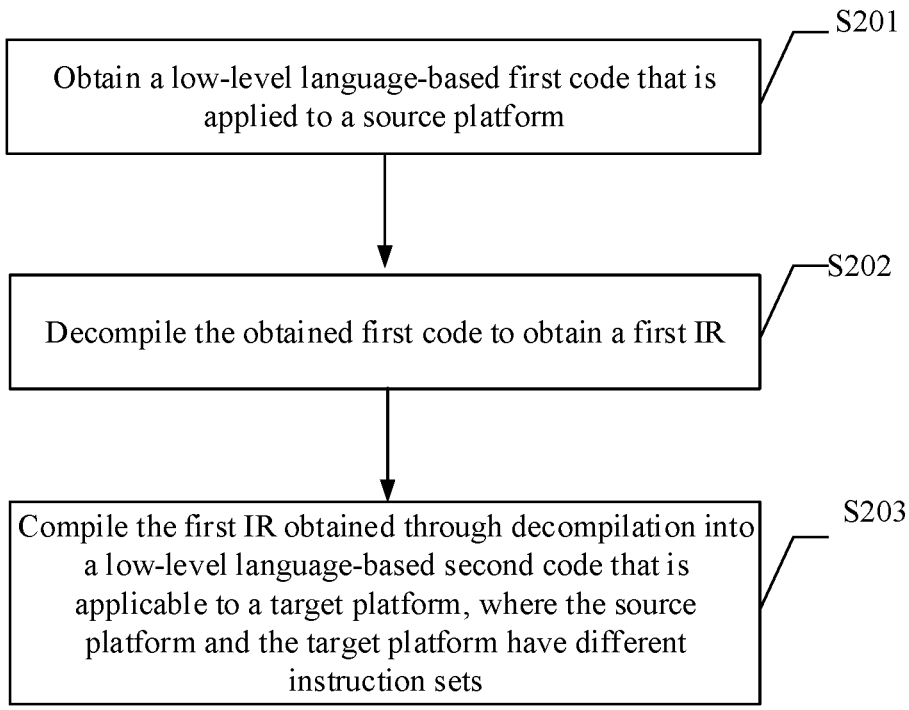
FIG. 2 is a schematic flowchart of a code processing method according to an embodiment of this application.

FIG. 2 is a schematic flowchart of a code processing method according to an embodiment of this application. The method may be applied to the target platform 104, or may be applied to a computing device. The computing device may be, for example, the foregoing terminal 105 or the server 106. In addition, the computing device may include a decompilation module 101 and a compilation module 102. The method may specifically include the following steps:

S201: Obtain a low-level language-based first code that is applied to a source platform.

In actual application, when software is run on the source platform, program code of the software is usually compiled into low-level language-based code that can be directly identified by the source platform. The low-level language refers to a program language or instruction code that can be directly identified by a machine, and may be specifically an assembly language, a machine language, or the like. Machine language is a language represented by binary code. Machine language is the only language that can be identified and executed by a computer. Assembly language is a language that uses mnemonics and symbols that are easy to understand and remember to represent operation codes in machine instructions in order to solve a disadvantage of the machine language being hard to understand and remember. As assembly language uses symbols to replace the binary code of machine language, assembly language is essentially a symbolic language.

There is also a machine-independent, process/object-oriented high-level language relative to low-level languages. A high-level programming language is typically close to a natural language, and has a strong expression capability with mathematical expressions. It can conveniently represent a data operation and a program control structure, and can better describe various algorithms, for example, languages such as C, C++, and Java. The high-level language can be applied to different platforms such as a platform of an x86 instruction set architecture (a general-purpose computing platform developed by Intel, referred to as the x86 platform below), a platform of an advanced reduced instruction set computer (ARM) architecture (referred to as the ARM platform below), and a platform of a reduced instruction set (such as, Performance Optimization With Enhanced RISC—

Performance Computing) architecture. Generally, high-level programming language cannot be directly identified and executed by a machine. A developer can compile a high-level language-based code file by using a compiling program such as a compiler, to make the code file be identified and executed by the machine.

In this embodiment, the obtained first code may be a low-level language-based code, and the code can be applied to the source platform. For example, the obtained first code may be a file in the ".obj" format or code in another format that is obtained by assembly based on an assembly language corresponding to the source platform.

Alternatively, in another possible implementation, a high-level language-based variable may be obtained when the first code is obtained. For example, in an inline assembly scenario shown in FIG. 3, the obtained first code is assembly language-based code in the format of "movdqa %%xmm4, 16 (%0)" or the like, and the high-level language-based variables are specifically &ff_inverse[0] and &ff_inverse[8] in "r"(&ff_inverse[0]),"r"(&ff_inverse[8]). Inline assembly is typically a coding method used to improve code execution efficiency and to execute processor-specific instructions. In this case, after assembly processing is performed on the inline assembly-based code, a first code in the ".obj" format or the like may be obtained.

For example, the first code in this embodiment may be code in the "obj" format obtained after assembly processing is performed on the entire assembly language-based program code of software on the source platform, or code in the "obj" format obtained after assembly processing is performed on part of the program code, for example, one of a plurality of code files of the software. Alternatively, the code may be a segment of code in a code file, for example, code obtained by compiling a code block shown in FIG. 3. In other words, partial decompilation processing may be performed on the software code in this embodiment.

In this embodiment, the source platform to which the first code is applied is different from the target platform to which the first code is migrated, and specifically, the two platforms may have different instruction sets. The source platform and the target platform may belong to different types of platforms. For example, the source platform may be the x86 platform, and the target platform may be the ARMv8 platform (a processor architecture, supporting a 64-bit instruction set, released by the ARM company); or the source platform and the target platform may be two different platforms of a same type, to be specific, the source platform may be Pentium II of the x86 platform, and the target platform may be Pentium III (with a new SSE instruction set introduced) of the x86 platform. Alternatively, the source platform may be a 32-bit version of the x86 platform, and the target platform may be a 64-bit version, that is, x86-64 platform.

S202: Decompile the obtained first code to obtain a first IR.

In this embodiment, in a process of migrating the first code applied to the source platform to the target platform for running, the decompilation module 101 may be first used to decompile the first code. Specifically, lexical analysis, syntax analysis, and semantic analysis may be performed on the input first code, and the input first code is converted into an IR of the compiler. The IR of the compiler is a decompilation result corresponding to the first code. The IR of the compiler may represent semantics and a syntax structure of the first code, and may be considered as another high-level language.

In an example, only the low-level language-based first code may be obtained. In this case, the decompilation module 101 may decompile the first code into an IR of the compiler. In another example, during obtaining the low-level language-based first code, the high-level language-based variable may further be obtained. In this case, when decompiling the first code, the decompilation module 101 further needs to perform parameterized translation on the high-level language-based variable, to avoid a loss of high-level language-based variable information in the first code.

Figures 3, 4:
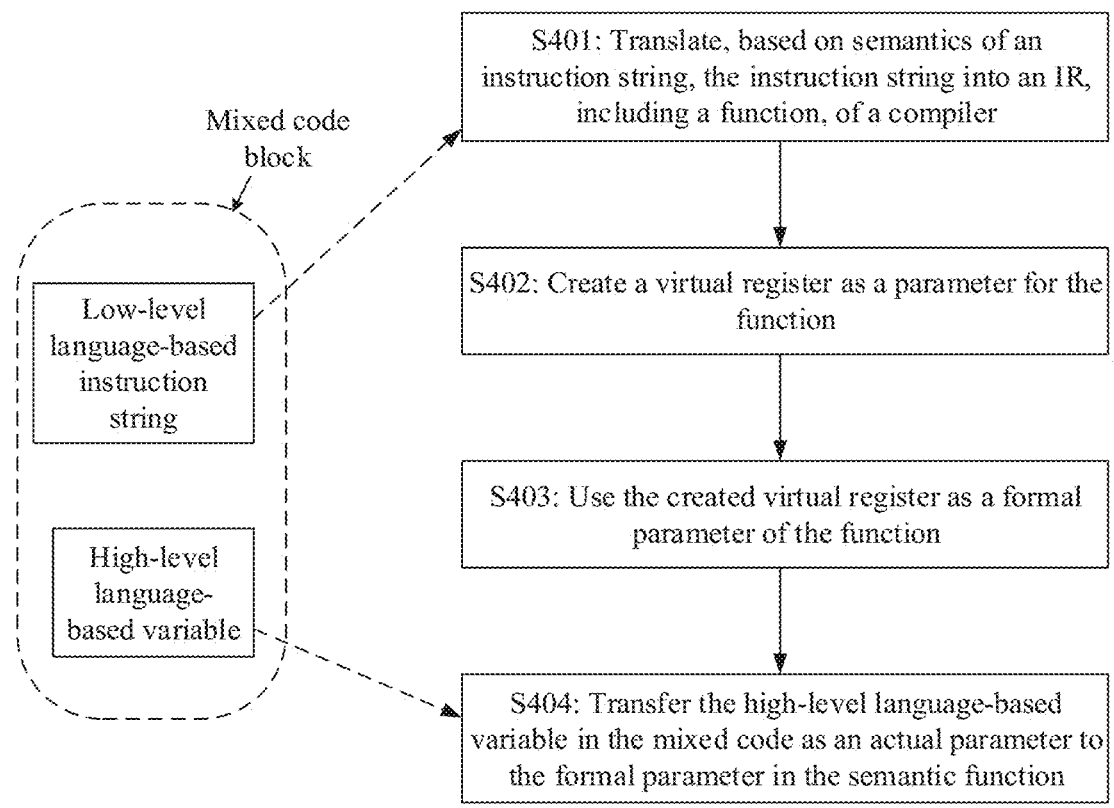
FIG. 3 is a schematic diagram of code in an inline assembly scenario according to an embodiment of this application.
FIG. 4 is a schematic flowchart of parameterized translation according to an embodiment of this application.

Specifically, refer to a parameterized translation procedure shown in FIG. 4.

S401: For a low-level language-based instruction string in a mixed code block, the decompilation module 101 may translate, based on semantics of the instruction string, the instruction string into a first IR, including a function, of the compiler, where semantics expressed by the function included in the first IR is consistent with the semantics of the instruction string. For example, when the instruction string is "ADD %x %y", a function included in an IR of the compiler obtained by translating the instruction string may be a function used for summation.

In an example implementation of translating the instruction string, the decompilation module 101 may pre-obtain correspondences between instruction semantics and functions. For example, the decompilation module 101 may pre-store the correspondences in the decompilation module 101. Then, the decompilation module 101 may determine semantics of a low-level language-based instruction string in the mixed code block. The instruction string may include one or more instructions, and the decompilation module may determine semantics of each instruction in the instruction string. Then, the decompilation module 101 determines, based on the semantics of each instruction in the instruction string and by searching the correspondences between semantics and functions, a function corresponding to the semantics of each instruction in the instruction string, so as to further generate, according to the determined function, a first IR including the function.

In an example, the decompilation module 101 may determine semantics of each instruction in the instruction string by searching an instruction semantic library corresponding to the source platform (for example, a person skilled in the art performs semantic markup on instructions of the source platform in advance, and imports the instructions and corresponding instruction semantics into the decompilation module 101). The instruction semantic library includes a plurality of instructions of the source platform, and semantic markup of each instruction is completed in advance. When instruction A in the first code and instruction a in the instruction semantic library have a same syntax structure, it may be determined that semantics of the instruction a in the instruction semantic library is semantics of the instruction A in the first code. In actual application, semantics of each instruction may alternatively be determined in another manner, which is not limited in this embodiment.

S402: When determining a function corresponding to the instruction string, the decompilation module 101 may create a virtual register as a parameter for the function.

S403: The decompilation module 101 references the created virtual register for the function determined in the translation process, and uses the virtual register as a formal parameter of the function.

S404: The decompilation module 101 establishes a correspondence between the high-level language-based variable and the formal parameter in the function, to transfer the high-level language-based variable in the mixed code as an actual parameter to the formal parameter in the semantic function.

For example, the decompilation module 101 may count the high-level language-based variables in the mixed code block, to obtain a list including a plurality of high-level language-based variables. Then, the variables in the list are made corresponding to formal parameters in the function based on locations of the formal parameters in the IR and a calling convention of the compiler. For example, the $1^{st}$ variable in the list may be made corresponding to the first formal parameter in the first function in the IR, and the $2^{nd}$ variable in the list may be made corresponding to the second formal parameter in the first function in the IR.

In this way, in the decompilation process, the high-level language-based variable information may be retained in the function as an actual parameter, and no information loss occurs. Therefore, in the inline assembly scenario, code information before and after the decompilation process is consistent.

In actual application, the decompilation module 101 may first determine whether code that needs to be decompiled includes only the low-level language-based first code, or includes both the first code and the high-level language-based variable. In a possible implementation, the decompilation module 101 may first detect a compilation command of the code that needs to be decompiled and a file type of the code, to determine whether the first code is high-level language-based code or low-level language-based code. Further, when determining, based on the compilation command and the file type, that the code is low-level language-based code, the decompilation module 101 may further determine, based on syntax in the code, whether the code is all low-level language-based first code or a mixed code block that includes both the low-level language-based first code and a high-level language-based variable, for example, inline assembly-based code including C/C++ language and assembly language (low-level language).

Further, if the first code is a mixed code block including a low-level language-based second code and a high-level language-based variable, in a process of decompiling the first code, the decompilation module 101 may perform the foregoing parameterized translation process on the high-level language-based variable in the first code.

In this embodiment, the first code usually includes at least one function to be called. The called function is essentially a variable. For example, in a function y=a+b*c, function y is essentially a variable. In some possible implementations, a function body of the function is further associated with another variable. For example, the function y is further associated with variables a, b, and c. Based on this, variables associated with the function include the function itself and variables associated with the function body. For example, variables associated with the function y include y, a, b, and c. An address of the variable, associated with the function, in the first code is a relative address, that is, an address of each variable is indefinite. Therefore, before translating the instruction in the first code into the first IR of the compiler, based on the instruction semantic library corresponding to the source platform, the decompilation module 101 may further relocate variables (other than the high-level language-based variable) in the IR, to determine an absolute address of each variable in the first code.

For example, the first code includes a first variable and a second variable. Before performing decompilation, the decompilation module 101 may configure a preset first logical address for the first variable in the first code, and configure a preset second logical address for the second variable in the first code. In addition, the first logical address and the second logical address may be different. During specific implementation, the decompilation module may access a relocation table. The relocation table stores logical address information of a plurality of variables (including the first variable and the second variable). The decompilation module 101 determines, based on the logical address information in the redirection table, logical addresses (namely, absolute addresses corresponding to the variables) respectively corresponding to the first variable and the second variable, and associates the logical addresses with symbols of the variables. The address information configured for the first variable and the second variable may be false logical address information. Then, the decompilation module 101 may decompile, by using the instruction semantic library corresponding to the source platform, the first code with variables that have been configured addresses, to obtain the first IR of the compiler. In this way, in a subsequent compilation phase, the logical addresses of the variables are recompiled into relocation information of the target platform. In other words, in the compilation phase, the variables in the first IR of the compiler may point to specific logical addresses.

In actual application, in addition to different instruction sets, there may be other differences between the source platform and the target platform. For example, there may be a difference between function calling conventions or a difference between single instruction multi data (SIMD) instructions of the source platform and the target platform. Therefore, in some implementations, when decompiling the first code, the decompilation module 101 may first determine a difference between the source platform and the target platform, and decompile the first code based on the difference. The difference between the source platform and the target platform may be determined in advance by a person skilled in the art by comparing function calling conventions or SIMD instructions of the source platform and the target platform, and then is imported into the decompilation module 101. This is not limited in this embodiment.

In another possible implementation, the decompilation module 101 may directly decompile the first code based on the function calling convention or the SIMD instruction of the target platform, or the like. This is not limited in this embodiment. In this way, after the foregoing differentiated processing or decompilation directly performed based on information about the target platform, a function calling convention or a SIMD instruction in the obtained IR can meet requirements, for the function calling convention and the SIMD instruction, of the target platform.

For ease of understanding, the following provides description by using an example in which the parameter in the first code is adjusted based on differences between the function calling conventions of the target platform and the source platform.

Specifically, the parameter of the function is stored in a register or stored in a stack of a memory. A storage manner of the parameter varies according to the platform. The decompilation module 101 may adjust register information or stack information of a function in a source code block based on a difference between function calling rules of the source platform and the target platform. For example, the decompilation module 101 may adjust a parameter stored in a register, and store the parameter in a stack; or adjust a parameter stored in a stack, and store the parameter in a register.

Before adjusting the register information or the stack information, the decompilation module 101 may first decode the source code block by using a decoding (decode) tool, for example, intel xed, to obtain an instruction control flow.

Then, the decompilation module 101 may execute a data flow analysis algorithm for the instruction control flow, to analyze live registers and stacks, so as to obtain a type and a quantity of the parameter of the function in the source code block. The parameter type is mainly used to indicate that the parameter is stored in a register or a stack.

For ease of understanding, the following separately describes processes of register analysis and stack analysis in detail.

First, several datasets are defined in this embodiment:
Use[n]: set of variables used by n;
Def[n]: set of variables defined by n;
In[n]: variables live on entry to n; and
Out[n]: variables live on exit to n.

Herein, variables represent registers corresponding to the variables. In[n] and Out[n] represent sets of registers corresponding to input and output, respectively. Def[n] and Use[n] represent sets of registers corresponding to definition and use, respectively.

The decompilation module 101 may traverse blocks (block) in the source code block, and construct a use set and a def set of each block. A specific construction process is as follows:
(a) instructions in the block are traversed according to an execution order of the instructions in the block;
(b) if a type of operand of an instruction is Register and action is kActionRead, the register is added to the use set;
(c) if a type of operand of an instruction is Register and action is kActionWrite, the register is added to the def set; and
(d) if a type of operand of an instruction is Address, base_reg and index_reg are added to the use set.

The decompilation module 101 may create a data flow analysis equation based on the foregoing sets, as shown below:

$$in[n] \supseteq use[n]$$

$$in[n] \supseteq out[n]-def[n]$$

$$out[n] \supseteq in[n'], \text{ if } n' \in succ[n] \quad (1)$$

Herein, n represents a block, the symbol ∈ indicates that a set on the right of the symbol is a subset of a set on the left of the symbol, and succ[n] represents a register that is still effective in the block is represented.

The decompilation module 101 may solve the foregoing equation by using a fixed point algorithm. Details are described below:

$$out[n] = \cup_{i \in succ[n]} in[i], \text{ where } i \text{ represents a succeeding block of any value of } n$$

$$in[n] = use[n] \cup (out[n]-def[n]) \quad (2)$$

After the fixed point algorithm is used, an intersection of an in set at a function entry and an input parameter Reg specified by Calling Convention is determined as an input parameter register; and an intersection of an out set at a function exit and an output parameter Reg specified by Calling Convention is determined as a possible return value register.

When performing stack analysis, the decompilation module 101 may analyze and implement the instruction control flow by using an algorithm based on an extended stack pointer (rex-extended stack pointer, RSP) register or by using an algorithm based on an extended base pointer (rex-extended base pointer, RBP) register.

A process in which the decompilation module 101 performs analysis by using the RSP-based algorithm may specifically include the following steps:
a. It is determined whether an RSP has an offset based on a function prologue part (entry basic block) and an offset is recorded if there is any.

The decompilation module 101 may determine the offset by using a sub instruction or a push instruction. The decompilation module 101 further records a register associated with the RSP.
b. All instructions in all blocks are traversed and an application scenario in which Operand Type is kTypeAddress, action is kActionRead, base_reg=RSP (associated register), and a memory displacement (dis) is a positive number is searched for. This parameter is a (dis-off)/8$^{th}$ stack parameter, and then a total quantity S of parameters is counted.
c. If rule b is satisfied, the parameter type is further determined.

If an operand of another register of the same instruction is an integer register (RXX) and the instruction is an instruction related to non-floating-point→integer conversion, the stack parameter is integer. If an operand of another register of the same instruction is a floating point register (XMM) and the instruction is an instruction related to non-integer→floating point conversion, the stack parameter is floating point.

A process in which the decompilation module 101 performs analysis by using the RBP-based algorithm may specifically include the following steps:
a. All instructions in all blocks are traversed and an application scenario in which operand Type is kTypeAddress, action is kActionRead, base_reg=RBP, and dis is a positive number is searched for. This parameter is a (dis−8)/8$^{th}$ stack parameter, and a total quantity X of parameters is counted.
b. If rule a is satisfied, the parameter type is further determined.

If an operand of another register of the same instruction is an integer register (RXX) and the instruction is an instruction related to non-floating-point→integer conversion, the stack parameter is integer; and if an operand of another register of the same instruction is a floating point register (XMM) and the instruction is an instruction related to non-integer→floating point conversion, the stack parameter is floating point.

In some possible implementations, the decompilation module 101 may simultaneously execute the foregoing two algorithms, and then take a maximum value of the total quantity S of parameters determined by using the two algorithms.

After the total quantity of parameters and the parameter type are obtained, the decompilation module 101 may adjust storage locations of the parameters based on a difference between function calling rules. Specifically, the decompilation module 101 performs cross-platform processing on the input parameter register and a stack based on the difference of function calling rules, for example, pushing several parameters in the register into the stack, and switching of a stack pointer, so that perspectives of input parameter registers and stack space of runtime on different platforms are consistent.

For ease of understanding, the following provides description with reference to a specific example.

Figure 5:
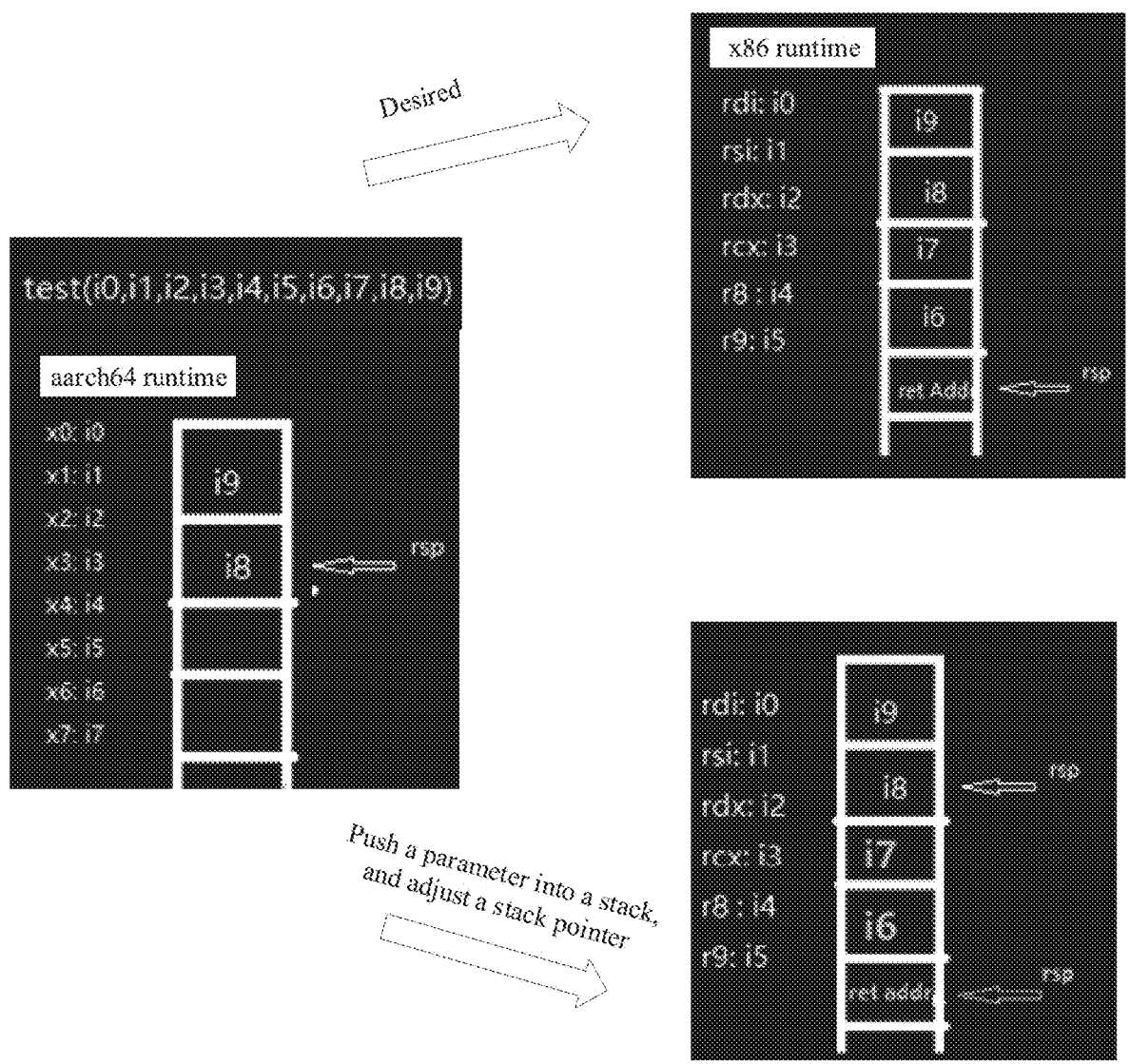
FIG. 5 is a schematic diagram of adjusting a parameter of a function according to an embodiment of this application.

Refer to a schematic diagram of adjusting a parameter of a function shown in FIG. 5. In this example, the test function includes 10 parameters ranging from i0 to i9. In runtime on the x86 platform, the parameters i0 to i5 are stored in registers, and the parameters i6 to i9 are stored in stacks. In runtime on an ARM platform, the parameters i0 to i7 are stored in registers, and the parameters i8 and i9 are stored in stacks. The decompilation module 101 may push the parameters i6 and i7 into the stack, and switch the stack pointer, so that perspectives of input parameter registers and stack space of runtime on different platforms are consistent.

In the method, the compiler is used to perform analysis on live registers and stacks to obtain accurate input parameter registers and stack input parameters. This reduces unnecessary register conversion for a function calling convention.

Further, when the source platform and the target platform belong to different types of platforms, for example, the source platform and the target platform are the x86 platform and an ARM platform respectively, before decompiling the first code, the decompilation module 101 may further obtain annotation information corresponding to the first code. The annotation information of the first code may include, for example, any one or more of a type, a quantity, and a jump address type (internal or external jump or the like of assembly code) of a parameter in the first code. Therefore, when decompiling the first code, the decompilation module 101 may determine a type, a quantity, and a jump address type of a parameter in an IR of the compiler based on the annotation information. The annotation information in the first code may be generated in a process of compiling code in the assembly language, and is used to carry related information of the assembly language. The parameter type in the annotation information is used as an example. Assuming that a length of the parameter in the first code is 64 bits, in the first IR obtained by decompiling the first code, the length of the parameter may still be 64 bits (for example, a floating point), rather than change to 32 bits (for example, an integer). In this way, the first code is decompiled based on the annotation information and the type of the parameter remains unchanged after decompilation, thereby reducing a possibility of a logic error in the first IR.

Certainly, in another possible implementation, the decompilation module 101 may decompile the first code without using annotation information. For example, when the source platform and the target platform are platforms of the same type, the two platforms are quite similar and have small differences in between. For example, for the assembly language of same instruction semantic, the source platform and the target platform differ only in instruction formats. In this case, the decompilation module 101 may still directly decompile the first code without using the annotation information in the first code.

Further, the instruction semantic library used to translate the instruction string may further include vectorized instruction semantics, for example, SIMD instruction semantics (the SIMD instruction may be used to separately perform a same operation on all data in a group of data at the same time, to achieve parallel processing in space). The vectorized instruction semantics may be used to perform vectorized translation on an instruction in the first code, so as to obtain a vectorized IR corresponding to the instruction.

Generally, vectorized code (instructions) can be used to replace a loop execution structure, which makes program code simpler and more efficient in execution. For example, when the first code includes the SIMD instruction (used to perform summation on a plurality of pieces of data), it is assumed that the decompilation module 101 does not perform vectorization processing on the SIMD instruction. In this case, a code execution process corresponding to the first IR obtained after decompilation refers to sequential operations of reading data from a group of data one by one and summing up the data. After vectorization processing is performed on the SIMD instruction, the code execution process corresponding to the first IR obtained after decompilation refers to operations of reading all data from the group of data, and performing parallel summation on all the data in the group.

The first code including the SIMD instruction is used as an example. When translating the first code, for another instruction in the first code, the decompilation module 101 may translate, based on semantics of the another instruction, the another instruction into an IR including a corresponding function. However, for the SIMD instruction in the first code, vectorized translation may be performed on the SIMD instruction to obtain a first IR having a mark for vectorization. In actual application, the mark for vectorization may be, for example, a special symbol in the first IR, such as "∧", "!", or "<". For example, a person skilled in the art may add semantics of the SIMD instruction of the source platform to the imported instruction semantic library in advance, so that in a compilation phase, the decompilation module 101 may identify the semantics of the SIMD instruction in the first code based on the instruction semantic library.

The decompilation module 101 may directly or indirectly translate the SIMD instruction in the first code into the IR having a mark for vectorization.

In a direct vectorization implementation, the decompilation module 101 may generate a low-level language-based third code applicable to the target platform. The third code may be, for example, a low-level language-based code that includes an intrinsic function corresponding to the target platform. The intrinsic function may package a language extension capability or a platform-related capability and define the capability in a header file in a high-level language such as C/C++. In this way, the generated third code related to the target platform may be used to describe vectorized semantics of the SIMD instruction of the source platform. Then, the decompilation module 101 may decompile the third code to obtain a first IR that corresponds to the SIMD instruction of the target platform and that has a mark for vectorization. In this way, subsequently, the compiler may obtain the SIMD instruction of the target platform after compiling the first IR.

In an indirect vectorization implementation, the decompilation module 101 may generate a high-level language-based fourth code that is irrelevant to the target platform. The fourth code may be used to describe the vectorized semantics of the SIMD instruction. Then, the decompilation module 101 may decompile the high-level language-based fourth code to obtain a first IR, irrelevant to the platform, having a mark for vectorization. In this way, subsequently, the compiler may perform automatic vectorized compilation on the first IR, to generate the SIMD instruction of the target platform.

S203: Compile the first IR obtained through decompilation into the low-level language-based second code that is applicable to the target platform, where the source platform and the target platform have different instruction sets.

During specific implementation, the compilation module 102 may compile the obtained first IR, to obtain the second code that can run on the target platform. Certainly, the second code is low-level language-based code supported by the target platform, for example, assembly code corresponding to the target platform.

Generally, the IR obtained by decompiling the first code may be optimized in some aspects. For example, the decompilation module 101 does not decompile the first code based on a capability of the target platform. As different platforms usually have different capabilities, to enable the IR obtained through decompilation to be applied to a plurality of platforms, the decompilation module 101 may decompile the first code based on minimum capabilities of the plurality of platforms. In this way, the decompilation module 101 may further optimize the obtained IR based on a relatively high capability of the target platform, so that execution efficiency of code corresponding to the IR is high on the target platform. The capability of the platform may include a data reading speed, a data access manner, and the like that are supported by the platform.

For example, it is assumed that when existing platforms read data, some platforms can read 64-bit (bit) data at one time, and other platforms can read 128-bit data at one time. Therefore, after the decompilation module 101 decompiles the first code, the obtained IR may be code shown in the upper part of FIG. 6. If the target platform reads only 64-bit data in each time of reading data based on the code, when reading 128-bit data, the target platform needs to read the 128-bit data in two times as the target platform actually has a capability of reading 128-bit data at one time. This decreases code execution efficiency. Therefore, the decompilation module 101 may optimize, based on the capability that the target platform can read 128 bits at one time, the code shown in the upper part of FIG. 6 to code shown in the lower part of FIG. 6, so that the target platform can read 128-bit data in each time of reading data based on the code.

Based on this, in a further possible implementation, the decompilation module 101 may decompile the first code to generate a second IR, and then optimize the second IR based on the first target platform to obtain the first IR. For example, after decompiling the first code to obtain the second IR, the decompilation module 101 may further determine semantics of each instruction string (sentence) in the second IR, and determine, based on correspondences between semantics and compilation for optimization rules, a compilation for optimization rule corresponding to the semantics of each instruction string in the second IR, to optimize the second IR according to the determined compilation for optimization rule so as to obtain the first IR. Then, the compilation module 102, when performing compilation, may compile the first IR obtained through optimization.

A binary file in the ".obj" format or another format may be obtained after the first IR is compiled, so that assembly language-based code that is applicable to the target platform may be generated based on the binary file. In this way, the assembly language-based code obtained through processing in the foregoing process can be applied to the target platform, so that the assembly language-based code can be successfully run on the target platform, and the code of the source platform can be migrated to the target platform.

In this embodiment, the target platform may be any platform different from the source platform, that is, the decompilation module 101 and the compilation module 102 may convert the first code into low-level language-based code applicable to any platform. Specifically, for ease of description, the target platform mentioned above may be referred to as a first target platform below. The decompilation module 101 and the compilation module 102 may not only convert, based on the foregoing process, the first code of the source platform into low-level language-based code applicable to the first target platform, but also convert, based on a similar process, the second code of the source platform into low-level language-based code applicable to a second target platform. The second target platform, the first target platform, and the source platform are different from each other, and specifically have different instruction sets.

In actual application, a target platform to which software code needs to be migrated may be determined based on a requirement of a user. In an example specific implementation, a target platform selection interface may be presented to the user. For example, a target platform selection interface shown in FIG. 7 may be presented on a display screen of a terminal. The target platform selection interface may provide a plurality of different candidate target platforms, such as a target platform 1, a target platform 2, . . . , and a target platform N (N is a positive integer greater than 1) shown in FIG. 7. The user may perform, on the target platform selection interface based on an actual requirement, a selection operation on a target platform from the plurality of presented candidate platforms, to determine the first target platform or the second target platform from the plurality of target platforms. In this way, the first code can be converted into low-level language-based code applicable to the first target platform or the second target platform by using the foregoing similar process. For example, the user may present a plurality of target platforms by clicking a drop-down list button by using a mouse. Then, the user moves a cursor to a desired target platform, and selects the target platform by clicking the mouse, so as to determine the first target platform.

Figure 7:
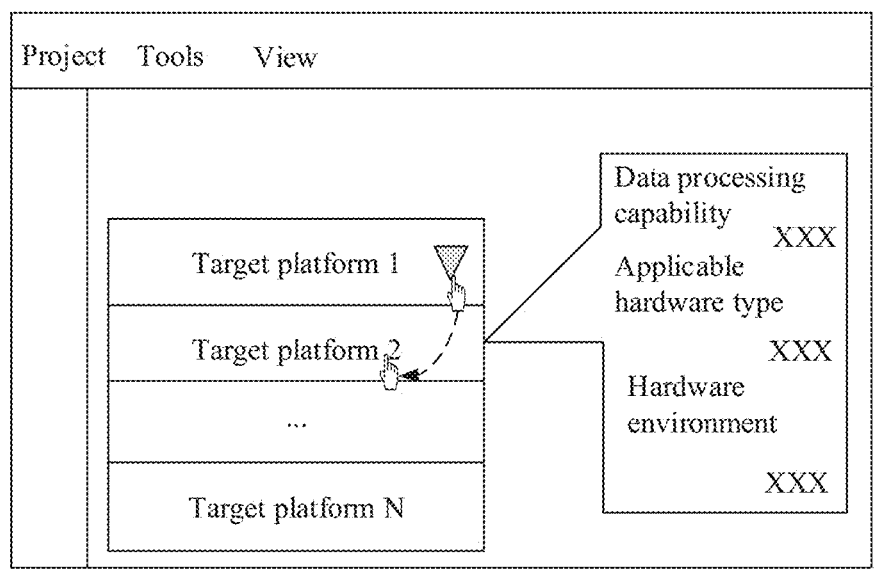
FIG. 7 is a schematic diagram of a target platform selection interface according to an embodiment of this application.

Further, related information of the target platform selected by the user may be further presented on the target platform selection interface. For example, as shown in FIG. 7, a data processing capability, an applicable hardware type, a required hardware environment, and the like of the target platform selected by the user may be further presented.

In addition, after the low-level language-based code applicable to the first target platform is obtained through the foregoing decompilation and compilation processes, prompt information corresponding to the code may be further generated. The prompt information may be used to indicate a difference between the source platform and the first target platform. Then, the prompt information may be presented on an interface on which the user selects the target platform, to prompt the user. For example, the user may be notified of a correspondence between an instruction in the first code and an instruction in code on the first target platform, for example, code instructions of two platforms are highlighted with a specific color. In actual application, the prompt information may alternatively be presented on another interface, and is not limited to the foregoing target platform selection interface. A manner of presenting the prompt information and a specific implementation thereof are not limited in this embodiment.

Figure 8:
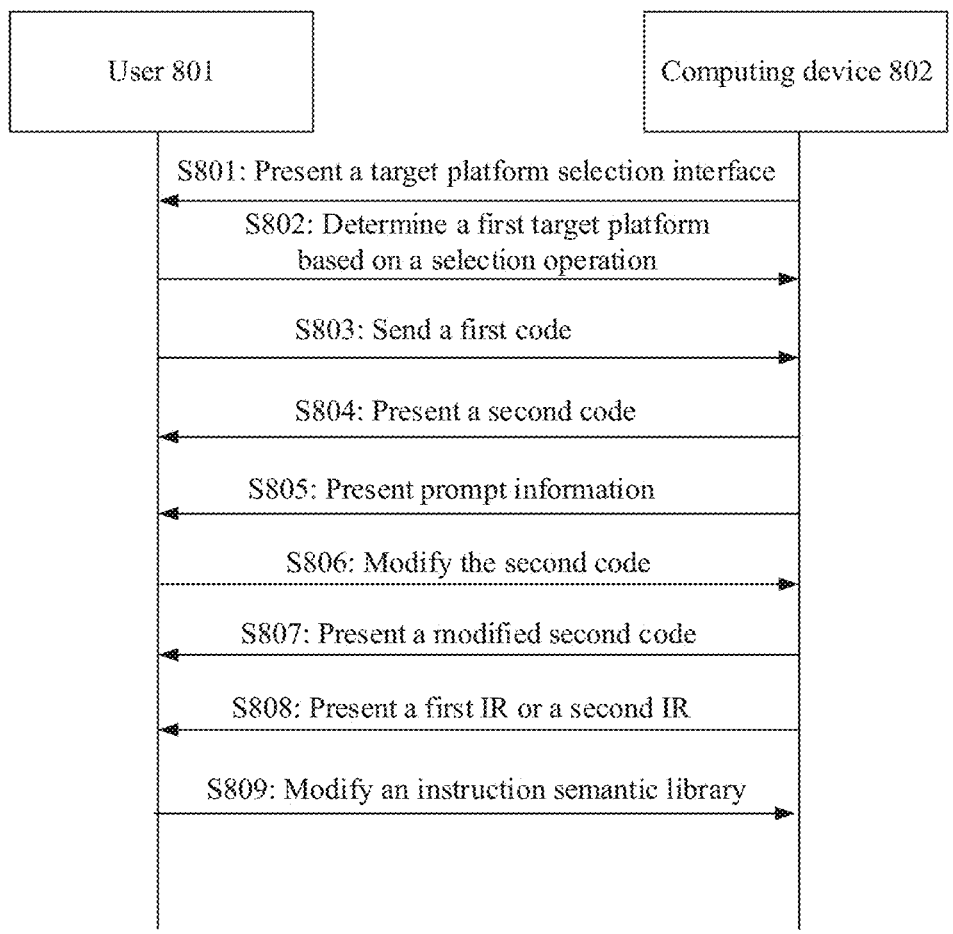
FIG. 8 is a schematic diagram of interaction between a user 801 and a computing device 802 according to an embodiment of this application.

For ease of understanding, the following describes the technical solutions in embodiments of this application from a perspective of human-computer interaction. Refer to a schematic flowchart of interaction between a user 801 and a computing device 802 shown in FIG. 8. The computing device 802 may be specifically a cloud device, for example, a cloud server, or a local terminal/server. As shown in FIG. 8, the procedure may specifically include the following steps:

S801: The computing device 802 presents a target platform selection interface to the user 801, where the target platform selection interface provides a plurality of candidate target platforms.

In this embodiment, the computing device 802 may support migrating software code to a plurality of different target platforms. The computing device 802 may first present a target platform selection interface to the user, and present, on the target platform selection interface, a target platform to which code can be migrated and that is supported by the computing device 802, for selection of the user. Different platforms at least have different instruction sets.

S802: The computing device 802 determines a first target platform from a plurality of target platforms based on a selection operation performed by the user on a target platform.

S803: The user 801 sends, to the computing device 802, a low-level language-based first code that is applied to a source platform.

The user 801 may specifically send the first code to the computing device 802 via a medium such as a terminal or a client.

In this embodiment, the first code may be a binary file in the ".obj" format, or a binary file in another format. In another embodiment, the user may send assembly language-based code of the source platform to the computing device 802. Then, after receiving the assembly language-based code, the computing device 802 may first perform assembly processing on the assembly language-based code to obtain a binary file in the ".obj" format or another format.

S804: The computing device 802 presents a second code on a code display interface. The second code is low-level language-based code that is applicable to the first target platform.

The second code is obtained by processing the first code. Specifically, the second code may be obtained after the computing device 802 performs decompilation and compilation on the first code. For specific implementation, refer to related descriptions in the foregoing embodiment. Details are not described herein again.

In addition, after obtaining the second code, the computing device 802 may present the second code on a corresponding code display interface, so that the user 801 can view information about the second code obtained through processing.

In this embodiment, the second code may be a binary file in the "obj" format or another format. In another possible embodiment, the second code may alternatively be code based on another language applicable to the first target platform, for example, assembly language-based code applicable to the first target platform. The assembly language-based code may be obtained by converting the file in the "obj" format generated by performing decompilation and compilation on the first code.

S805: The computing device 802 presents prompt information.

In this embodiment, the computing device 802 may prompt the user 801, for example, the user 801 is notified of a correspondence between an instruction in the first code and an instruction in the second code, or a problem that may occur in a code migration process. In this embodiment, content and specific implementation of the prompt information presented by the computing device 802 are not limited.

S806: The user 801 modifies the second code presented by the computing device 802.

For example, after viewing the second code or the prompt information, the user 801 may modify the second code. For example, when finding a logic bug in the second code after viewing the prompt information or the second code, the user 801 may modify the second code, to fix the logic bug.

S807: The computing device 802 presents a modified second code.

In actual application, the user 801 may continue to further modify the modified second code until the code meets an expectation of the user.

S808: The computing device 802 presents a first IR or a second IR.

In a process of decompiling the first code, the computing device 802 may first decompile the first code to obtain the second IR, and then optimize the second IR to obtain the first IR. In this case, the computing device 802 may present, to the user 801, the first IR or the second IR obtained in the decompilation process.

Then, the user 801 may view the first IR or the second IR presented by the computing device 802, and may debug the first IR or the second IR, so that the computing device 802 may obtain, based on a debugged first IR or second IR, a corresponding low-level language-based code that is applicable to the first target platform.

In a further possible implementation, this embodiment may further include:

S809: The user 801 modifies an instruction semantic library corresponding to the source platform.

In the decompilation process, the computing device 802 usually decompiles the first code based on the instruction semantic library corresponding to the source platform. The user may adjust, by viewing the second code, the prompt information, or the IR, the instruction semantic library used in the decompilation process, for example, add semantics of a SIMD instruction corresponding to the source platform to the instruction semantic library. In this way, when the first code is decompiled based on an adjusted instruction semantic library, an obtained IR or code that is applicable to the first target platform can be better.

It should be noted that, in this embodiment, for decompilation, compilation, and related processes performed on the first code by the computing device 802, refer to related descriptions in the foregoing embodiment. Details are not described herein again.

The foregoing describes in detail the code processing method provided in this application with reference to FIG. 1 to FIG. 8. The following describes a computing apparatus provided in this application with reference to FIG. 9 and FIG. 10.

Figure 9:
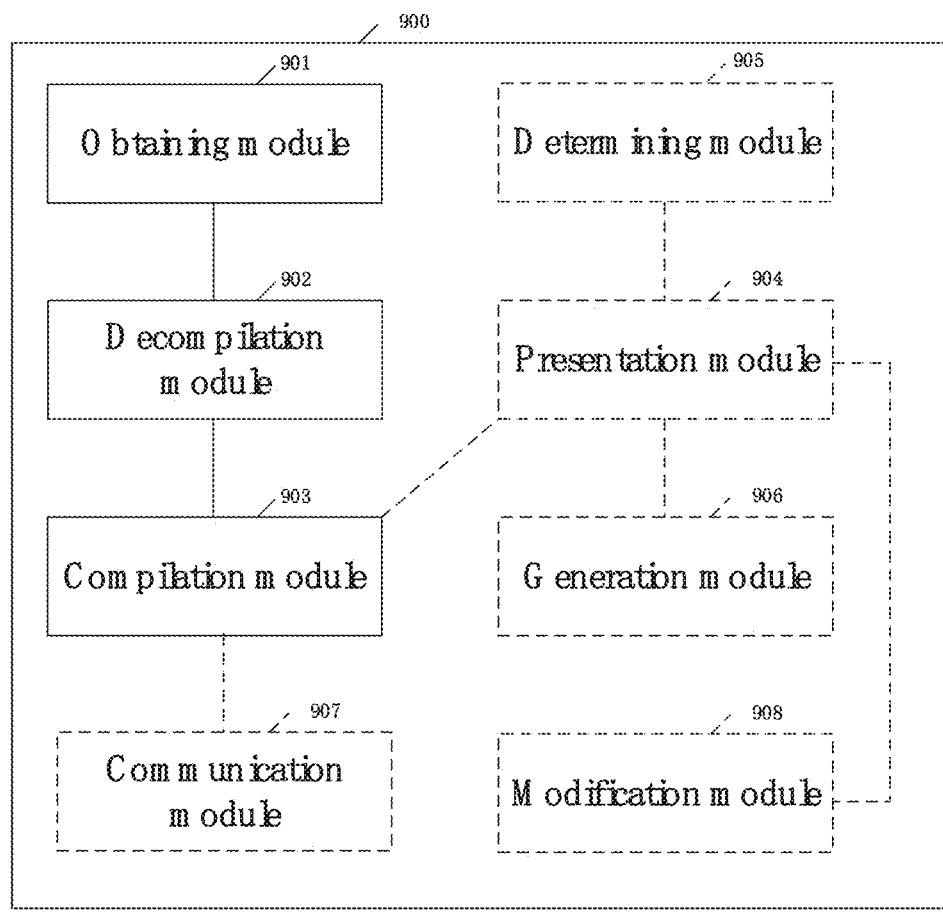
FIG. 9 is a schematic diagram of a structure of a computing apparatus according to an embodiment of this application.

Based on a same inventive concept as the foregoing method, an embodiment of this application further provides a computing apparatus. The apparatus may implement a function of a computing device in the embodiment shown in FIG. 2. Refer to FIG. 9. The apparatus 900 may include:

- an obtaining module 901, configured to obtain a low-level language-based first code that is applied to a source platform;
- a decompilation module 902, configured to decompile the first code to obtain a first intermediate representation IR; and
- a compilation module 903, configured to compile the first IR into a low-level language-based second code that is applicable to a first target platform, where the source platform and the first target platform have different instruction sets.

In a possible implementation, the decompilation module 902 is further configured to decompile the first code to obtain an IR corresponding to a second target platform, where the first IR is different from the IR corresponding to the second target platform, and the first target platform and the second target platform have different instruction sets.

In a possible implementation, the apparatus 900 further includes:

- a presentation module 904, configured to present a target platform selection interface; and a determining module 905, configured to determine the first target platform from a plurality of target platforms in response to a selection operation on a target platform.

In a possible implementation, the decompilation module 902 is specifically configured to:

obtain annotation information of the first code, where the annotation information includes any one or more of a type, a quantity, or a jump address type of a parameter in the first code; and decompile the first code based on the annotation information, to obtain the first IR.

In a possible implementation, the decompilation module 902 is specifically configured to:

decompile the first code to obtain a second IR; and optimize the second IR based on the first target platform, to obtain the first IR.

In a possible implementation, the apparatus 900 further includes:

a generation module 906, configured to generate prompt information, where the prompt information is used to prompt for a to-be-checked item, and the to-be-checked item is generated based on a difference between the first target platform and the source platform, where the presentation module 904 is configured to present the prompt information.

In a possible implementation, the apparatus is applied to a cloud, and the obtaining module 901 is specifically configured to receive the first code from a user.

The apparatus 900 further includes a communication module 907, configured to send, to the user, the low-level language-based second code that is applicable to the first target platform.

In a possible implementation, the decompilation module 902 is specifically configured to decompile the first code based on an instruction semantic library corresponding to the source platform.

In a possible implementation, the apparatus 900 further includes:

a modification module 908, configured to modify the instruction semantic library in response to a modification operation on the instruction semantic library.

In a possible implementation, the obtaining module 901 is specifically configured to obtain the low-level language-based first code that is applied to the source platform and a high-level language-based variable.

The decompilation module 902 is specifically configured to translate the first code into a first IR including a function, where the function includes a formal parameter, and an actual parameter corresponding to the formal parameter is the variable.

In a possible implementation, the first IR includes a first variable and a second variable, the first variable has a first logical address, the second variable has a second logical address, and the first logical address is different from the second logical address.

In a possible implementation, the decompilation module 902 is specifically configured to decompile the first code based on a function calling convention or a single instruction multiple data SIMD instruction of the target platform.

The computing apparatus 900 in this embodiment corresponds to the code processing method shown in FIG. 2. Therefore, for specific implementation of the functional modules in the computing apparatus 900 in this embodiment and technical effects thereof, refer to related descriptions in the embodiment shown in FIG. 2. Details are not described herein again.

Figure 10:
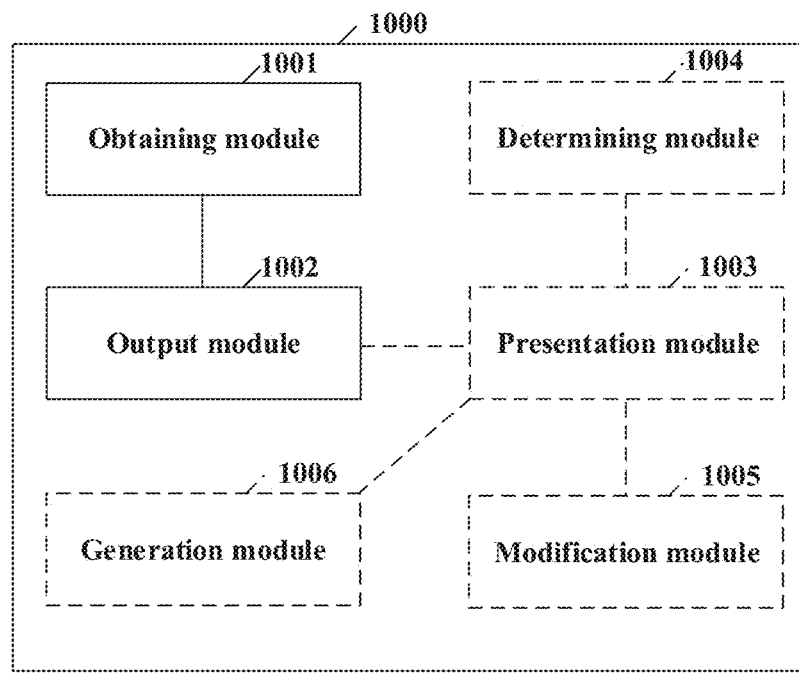
FIG. 10 is a schematic diagram of a structure of another computing apparatus according to an embodiment of this application.

In addition, an embodiment of this application further provides another computing apparatus. The apparatus may implement functions of the computing device 802 in the embodiment shown in FIG. 8. Refer to FIG. 10. The apparatus 1000 may include:

an obtaining module 1001, configured to obtain a low-level language-based first code that is applied to a source platform; and an output module 1002, configured to output a second code, where the second code is a low-level language-based code applicable to a first target platform, the second code is obtained by processing the first code, and the source platform and the first target platform have different instruction sets.

In a possible implementation, the output module 1002 is specifically configured to present the second code through a code display interface.

In a possible implementation, the apparatus is applied to a cloud, and the obtaining module 1001 is specifically configured to receive the first code from a user.

The output module 1002 is specifically configured to output the second code to the user.

In a possible implementation, the apparatus 1000 further includes:

a presentation module 1003, configured to present a target platform selection interface; and a determining module 1004, configured to determine the first target platform from a plurality of target platforms in response to a selection operation on a target platform.

In a possible implementation, the obtaining module 1001 is further configured to obtain an instruction semantic library corresponding to the source platform, where the instruction semantic library is used to process the first code.

In a possible implementation, the apparatus 1000 further includes:

a modification module 1005, configured to modify the instruction semantic library in response to a modification operation on the instruction semantic library.

In a possible implementation, the apparatus 1000 further includes:

a generation module 1006, configured to generate prompt information, where the prompt information is used to prompt for a to-be-checked item, and the to-be-checked item is generated based on a difference between the first target platform and the source platform, where the presentation module 1003 is configured to present the prompt information.

In a possible implementation, the apparatus 1000 further includes:

a presentation module 1003, configured to present a first intermediate representation IR, where the first IR is obtained by decompiling the first code, and the second code is obtained by compiling the first IR.

In a possible implementation, the presentation module 1003 is further configured to present a second IR, where the second IR is obtained by decompiling the first code, and the first IR is obtained by optimizing the first IR based on the first target platform.

In a possible implementation, the apparatus 1000 further includes:

a modification module 1005, configured to obtain a modified first IR in response to a modification operation on the first IR; and the presentation module 1003 is further configured to present a third code, where the third code is a low-level language-based code that is applicable to the first target platform, and the third code is obtained by compiling the modified first IR.

In a possible implementation, the presentation module 1003 is further configured to present a third IR, where the third IR is obtained by decompiling the first code, the third IR is used to generate a low-level language-based code that is applicable to a second target platform, and the third IR is different from the first IR.

In a possible implementation, the apparatus 1000 further includes:

a modification module 1005, configured to obtain a modified second code in response to a modification operation on the second code; and the output module 1002 is further configured to output the modified second code.

In a possible implementation, the obtaining module 1001 is specifically configured to obtain the low-level language-based first code that is applied to the source platform and a high-level language-based variable.

The computing apparatus 1000 in this embodiment corresponds to the code processing method shown in FIG. 8. Therefore, for specific implementation of the functional modules in the computing apparatus 1000 in this embodiment and technical effects thereof, refer to related descriptions in the embodiment shown in FIG. 8. Details are not described herein again.

Figure 11:
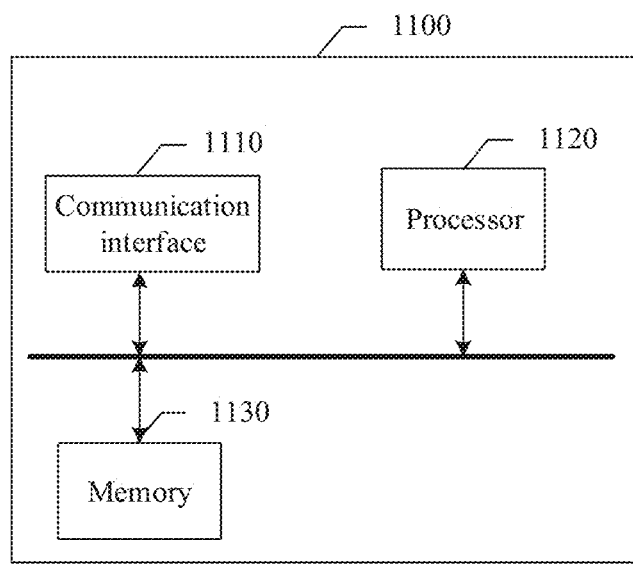
FIG. 11 is a schematic diagram of a hardware structure of a computing apparatus according to an embodiment of this application.

In addition, an embodiment of this application further provides a computing apparatus. As shown in FIG. 11, the apparatus 1100 may include a communication interface 1110 and a processor 1120. Optionally, the apparatus 1100 may further include a memory 1130. The memory 1130 may be disposed inside the apparatus 1100, or may be disposed outside the apparatus 1100. For example, all actions in the embodiment shown in FIG. 2 may be implemented by the processor 1120. The processor 1120 may obtain, through the communication interface 1110, a first code applied to a source platform, and is configured to implement any method performed in FIG. 2. In an implementation process, the steps of the processing procedure may be implemented by using an integrated logic circuit of hardware in the processor 1120 or an instruction in a form of software, to complete the method performed in FIG. 2. For brevity, details are not described herein again. Program code executed by the processor 1120 to implement the foregoing method may be stored in the memory 1130. The memory 1130 is connected to the processor 1120, for example, in a coupled connection.

Some features of this embodiment of this application may be completed/supported by the processor 1120 executing program instructions or software code in the memory 1230. Software components loaded onto the memory 1230 may be summarized in terms of functions or logic, for example, the obtaining module 901, the decompilation module 902, the compilation module 903, the presentation module 904, the determining module 905, the generation module 906, and the modification module 908 shown in FIG. 9. A function of the communication module 907 may be implemented by the communication interface 1110.

Any communication interface in this embodiment of this application may be a circuit, a bus, a transceiver, or another apparatus that may be configured to exchange information, for example, the communication interface 1110 in the apparatus 1100. For example, the another apparatus may be a device connected to the apparatus 1100, for example, a user terminal that provides a first code.

Figure 12:
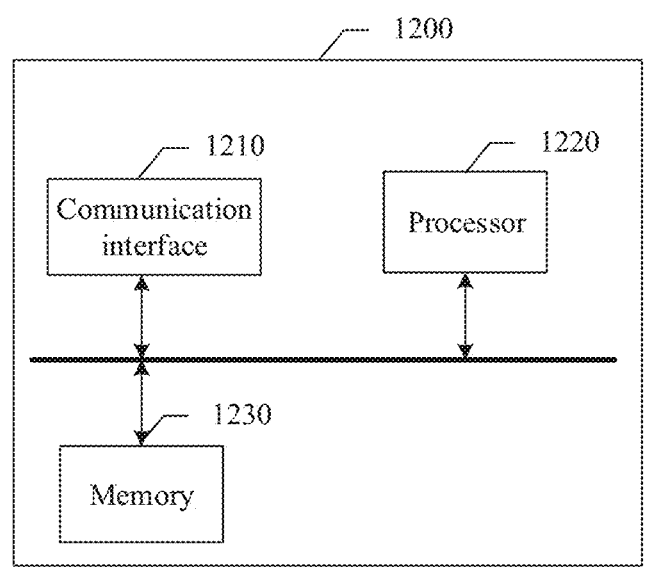
FIG. 12 is a schematic diagram of a hardware structure of still another computing apparatus according to an embodiment of this application.

In addition, an embodiment of this application further provides a computing apparatus. As shown in FIG. 12, the apparatus 1200 may include a communication interface 1210 and a processor 1220. Optionally, the apparatus 1200 may further include a memory 1230. The memory 1230 may be disposed inside the apparatus 1200, or may be disposed outside the apparatus 1200. For example, all actions in the embodiment shown in FIG. 8 may be implemented by the processor 1220. The processor 1220 may obtain, through the communication interface 1210, a first code applied to a source platform, and is configured to implement any method performed in FIG. 8. In an implementation process, the steps of the processing procedure may be implemented by using an integrated logic circuit of hardware in the processor 1220 or an instruction in a form of software, to complete the method performed in FIG. 8. For brevity, details are not described herein again. Program code executed by the processor 1220 to implement the foregoing method may be stored in the memory 1230. The memory 1230 is connected to the processor 1220, for example, in a coupled connection.

Some features of this embodiment of this application may be completed/supported by the processor 1220 executing program instructions or software code in the memory 1230. Software components loaded onto the memory 1230 may be summarized in terms of functions or logic, for example, the obtaining module 1001, the output module 1002, the presentation module 1003, the determining module 1004, the modification module 1005, and the generation module 1006 shown in FIG. 10.

Any communication interface in this embodiment of this application may be a circuit, a bus, a transceiver, or another apparatus that may be configured to exchange information, for example, the communication interface 1210 in the apparatus 1200. For example, the another apparatus may be a device connected to the apparatus 1200, for example, a user terminal that provides a first code.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware and software modules in the processor.

The coupling in embodiments of this application is indirect coupling or a communication connection between apparatuses, modules, or modules for information exchange between the apparatuses, the units, or the modules, and may be in electrical, mechanical, or other forms.

The processor may operate with the memory. The memory may be a nonvolatile memory, for example, a hard disk drive (HDD) or a solid-state drive (SSD), or may be a volatile memory (volatile memory), for example, a random access memory (RAM). The memory is any other medium that can carry or store expected program code having an instruction or in a form of a data structure and that can be accessed by a computer, but is not limited thereto.

A specific connection medium between the communication interface, the processor, and the memory is not limited in this embodiment of this application. For example, the memory, the processor, and the communication interface may be connected by using a bus. The bus may be classified into an address bus, a data bus, a control bus, and the like.

Based on the foregoing embodiments, an embodiment of this application further provides a computer storage medium. The storage medium stores a software program. When the software program is read and executed by one or more processors, the method performed by a proxy edge side device, an edge side device, or a cloud center provided in any one or more of the foregoing embodiments may be implemented. The computer storage medium may include: any medium that can store program code, such as a USB flash drive, a removable hard disk, a read-only memory, a random access memory, a magnetic disk, or an optical disc.

Based on the foregoing embodiments, an embodiment of this application further provides a chip. The chip includes a processor, configured to implement a function of the proxy edge side device or a function of the edge side device or a function of the cloud center in the foregoing embodiments. For example, the processor is configured to implement the method performed by the proxy edge side device in FIG. 3 and FIG. 4, configured to implement the method performed by the edge side device in FIG. 3 and FIG. 4, or configured to implement the method performed by the cloud center in FIG. 3 and FIG. 4. Optionally, the chip further includes a memory, and the memory is configured to store necessary program instructions and data that are executed by the processor. The chip may include a chip, or include a chip and another discrete device.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-available storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each procedure and/or each block in the flowcharts and/or the block diagrams and a combination of a procedure and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

In the specification, claims, and accompanying drawings of this application, the terms "first", "second", and the like are intended to distinguish between similar objects but do not necessarily indicate a specific order or sequence. It should be understood that the terms used in such way are interchangeable in proper circumstances, and this is merely a discrimination manner for describing objects having a same attribute in descriptions of embodiments of this application.

It is clear that a person skilled in the art can make various modifications and variations to embodiments of this application without departing from the scope of embodiments of this application. This application is intended to cover these modifications and variations provided that they fall within the scope of protection defined by the following claims and their equivalent technologies.

What is claimed is:

1. A method, wherein the method comprises:
    obtaining a first code in low-level language and applicable to a source platform;
    decompiling the first code to obtain a first intermediate representation (IR) based on a difference between a first single instruction multiple data (SIMD) instruction of the source platform and a second SIMD instruction of a first target platform; and
    compiling the first IR into a second code in low-level language and applicable to the first target platform, wherein the source platform and the first target platform have different instruction sets.

2. The method according to claim 1, wherein the method further comprises:
    decompiling the first code to obtain a second IR corresponding to a second target platform, wherein the first target platform and the second target platform have different instruction sets.

3. The method according to claim 1, wherein the method further comprises:
    presenting a target platform selection interface; and
    determining the first target platform from a plurality of target platforms in response to a selection operation on a target platform through the target platform selection interface.

4. The method according to claim 1, wherein the decompiling the first code to obtain a first IR comprises:
    obtaining annotation information of the first code, wherein the annotation information comprises one or more of a type, a quantity, or a jump address type of a parameter in the first code; and
    decompiling the first code based on the annotation information, to obtain the first IR.

5. The method according to claim 1, wherein the decompiling the first code to obtain a first IR comprises:
    decompiling the first code to obtain a second IR; and
    optimizing the second IR based on the first target platform, to obtain the first IR.

6. The method according to claim 1, wherein the method further comprises:
    generating prompt information that prompts for a to-be-checked item to be generated based on a difference between the first target platform and the source platform; and presenting the prompt information.

7. The method according to claim 1, wherein the method is applied to a cloud, wherein the first code is obtained from a user, and wherein the method further comprises:
sending the second code to the user.

8. The method according to claim 1, wherein the decompiling the first code comprises:
decompiling the first code based on an instruction semantic library corresponding to the source platform.

9. The method according to claim 8, wherein the method further comprises:
modifying the instruction semantic library in response to a modification operation on the instruction semantic library.

10. The method according to claim 1, wherein the obtaining a first code in low-level language and applicable to a source platform comprises:
obtaining the first code in low-level language and applicable to the source platform and a variable in high-level language; and
the decompiling the first code comprises:
translating the first code into the first IR, wherein the variable is an actual parameter corresponding to a formal parameter comprised in a function of the first IR.

11. The method according to claim 1, wherein the first IR comprises a first variable and a second variable, the first variable has a first logical address, the second variable has a second logical address different from the first logical address.

12. The method according to claim 1, wherein
the second SIMD instruction of the first target platform is a vectorized instruction configured to perform a same operation on a group of data in parallel.

13. A computing apparatus, wherein the computing apparatus comprises at least one memory and at least one processor, the at least one memory is coupled to the at least one processor, and the at least one memory stores programming instructions for execution by the at least one processor to cause the computing apparatus to perform operations comprising:
obtaining a first code in low-level language and applicable to a source platform;
decompiling the first code to obtain a first intermediate representation (IR) based on a difference between a first single instruction multiple data (SIMD) instruction of the source platform and a second SIMD instruction of a first target platform; and
compiling the first IR into a second code in low-level language and applicable to the first target platform, wherein the source platform and the first target platform have different instruction sets.

14. The computing apparatus of claim 13, wherein the operations further comprise:
decompiling the first code to obtain a second IR corresponding to a second target platform, wherein the first target platform and the second target platform have different instruction sets.

15. The computing apparatus of claim 13, wherein the operations further comprise:
presenting a target platform selection interface; and
determining the first target platform from a plurality of target platforms in response to a selection operation on a target platform through the target platform selection interface.

16. The computing apparatus of claim 13, wherein the decompiling the first code to obtain a first IR comprises:
obtaining annotation information of the first code, wherein the annotation information comprises one or more of a type, a quantity, or a jump address type of a parameter in the first code; and
decompiling the first code based on the annotation information, to obtain the first IR.

17. The computing apparatus of claim 13, wherein the decompiling the first code to obtain a first IR comprises:
decompiling the first code to obtain a second IR; and
optimizing the second IR based on the first target platform, to obtain the first IR.

18. The computing apparatus of claim 13, wherein the operations further comprise:
generating prompt information that prompts for a to-be-checked item to be generated based on a difference between the first target platform and the source platform; and
presenting the prompt information.

19. The computing apparatus of claim 13, wherein the first code is obtained from a user, and wherein the operations further comprise:
sending the second code to the user.

20. A non-volatility computer-readable storage medium comprising programming instructions for execution by at least one processor of a computing apparatus to cause the computing apparatus to perform operations comprising:
obtaining a first code in low-level language and applicable to a source platform;
decompiling the first code to obtain a first intermediate representation (IR) based on a difference between a first single instruction multiple data (SIMD) instruction of the source platform and a second SIMD instruction of a first target platform; and
compiling the first IR into a second code in low-level language and applicable to the first target platform, wherein the source platform and the first target platform have different instruction sets.

* * * * *